US006934219B2

(12) United States Patent
Burkholder et al.

(10) Patent No.: US 6,934,219 B2
(45) Date of Patent: Aug. 23, 2005

(54) METHODS AND SYSTEMS FOR ACQUIRING SEISMIC DATA

(75) Inventors: Scott K. Burkholder, Littleton, CO (US); Paul D. Favret, Littleton, CO (US); Todd J. Fockler, Golden, CO (US); Robert Stewart, Boulder, CO (US)

(73) Assignee: Ascend Geo, LLC, Denver, CO (US)

( * ) Notice: Subject to any disclaimer, the term of this patent is extended or adjusted under 35 U.S.C. 154(b) by 34 days.

(21) Appl. No.: 10/418,940

(22) Filed: Apr. 18, 2003

(65) Prior Publication Data

US 2003/0202424 A1 Oct. 30, 2003

Related U.S. Application Data

(60) Provisional application No. 60/375,545, filed on Apr. 24, 2002.

(51) Int. Cl.[7] .............................. G01V 1/24; G01V 1/28
(52) U.S. Cl. .............................. 367/55; 367/39; 367/42
(58) Field of Search .............................. 367/39, 42, 55, 367/77; 181/107

(56) References Cited

U.S. PATENT DOCUMENTS

| 3,812,457 | A | | 5/1974 | Weller |
| 4,070,643 | A | | 1/1978 | Green |
| 4,493,063 | A | | 1/1985 | Tims et al. |
| 4,750,156 | A | | 6/1988 | Abrams et al. |
| 5,276,655 | A | | 1/1994 | Rialan et al. |
| 5,548,562 | A | * | 8/1996 | Helgerud et al. ............ 181/107 |
| 5,978,313 | A | * | 11/1999 | Longaker .................... 181/107 |
| 6,002,339 | A | * | 12/1999 | Norris ........................ 367/55 |
| 6,070,129 | A | | 5/2000 | Grouffal et al. |
| 6,078,283 | A | | 6/2000 | Bednar |
| 6,219,620 | B1 | | 4/2001 | Park et al. |
| 2004/0105533 | A1 | * | 6/2004 | Iseli ...................... 379/106.01 |

\* cited by examiner

*Primary Examiner*—Ian J. Lobo
(74) *Attorney, Agent, or Firm*—Townsend and Townsend and Crew, LLP

(57) ABSTRACT

Methods and systems are provided for acquiring seismic data. Data are collected representing acoustic signals received from the Earth at distinct geographic locations. Data representing an ambient signal at the distinct geographic locations are also collected. For each of the geographic locations, a known time dependence of the ambient signal is correlated with a time dependence of the collected acoustic-signal data to define time-correlated acoustic signal data. The collected acoustic-signal data for the distinct geographic locations are synchronized from the time-correlated acoustic-signal data.

18 Claims, 7 Drawing Sheets

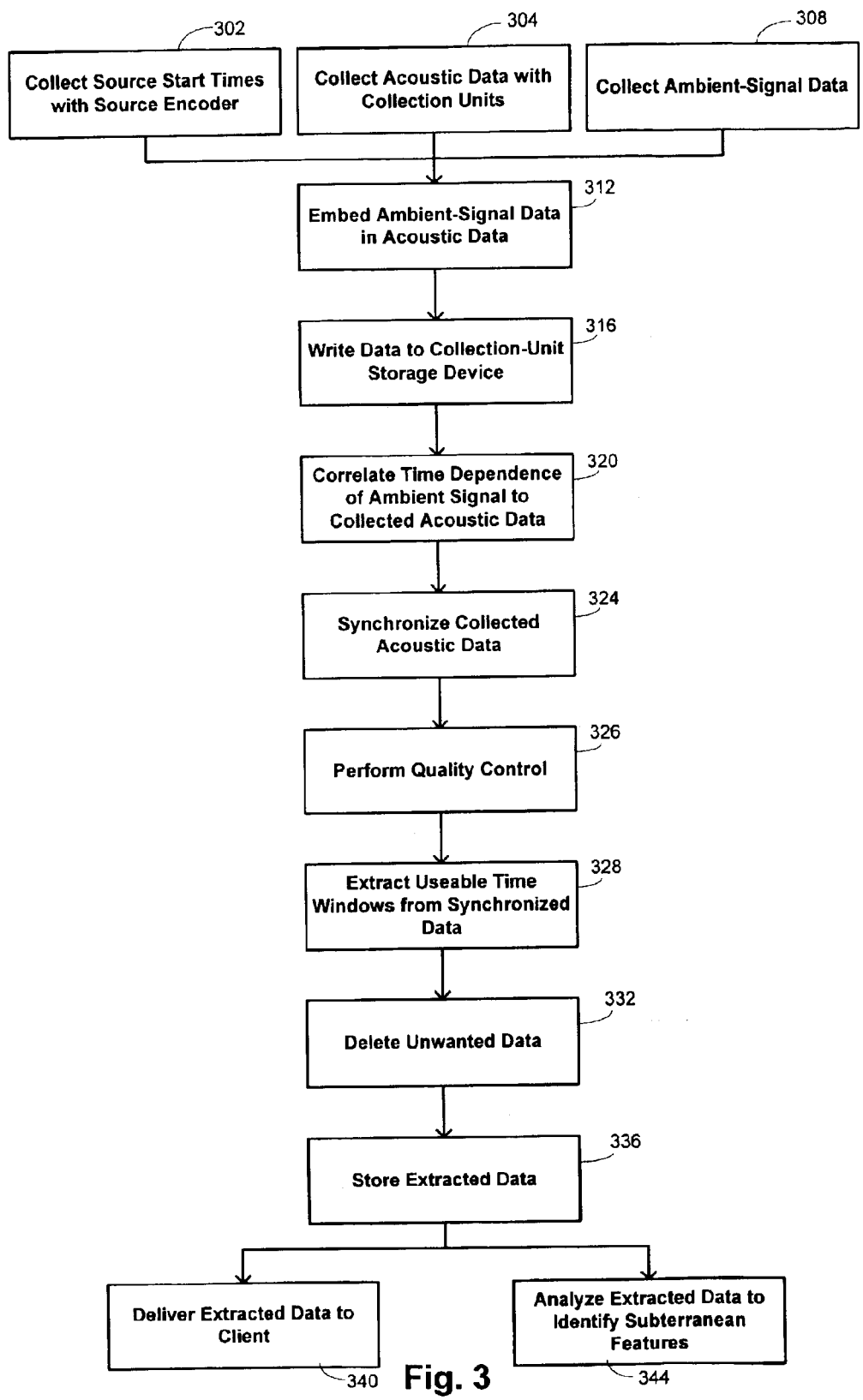

METHODS AND SYSTEMS FOR ACQUIRING SEISMIC DATA

CROSS-REFERENCES TO RELATED APPLICATIONS

This application is a nonprovisional of U.S. Prov. Appl. No. 60/375,545, entitled "A CABLE-LESS SEISMIC DATA RECORDER AND A METHOD FOR SYNCHRONIZING MULTIPLE SEISMIC DATA SETS," filed Apr. 24, 2002, the entire disclosure of which is incorporated herein by reference for all purposes.

BACKGROUND OF THE INVENTION

This application relates generally to methods and systems for acquiring seismic data. More specifically, this application relates to methods and systems for acquiring seismic data without the need for wireline telemetry or radio-telemetry components or radio initiation.

Present-day land-based oil and gas drilling sites are selected from three-dimensional images produced through the use of reflection seismic data. The images are developed from data acquisition through active seismic tomography. Synthesized physical shock waves are applied to a survey site. These waves reflect off rock strata at variable velocities and return to the surface. Geophones at the surface measure and record the ground motion at the survey site. The seismic response from each receiver point (a geophone unit or the summed response of several geophone units) is collected centrally by a data collection center. The collected data are reduced through sophisticated computer analysis for producing three-dimensional maps of the geologic structure.

A typical seismic survey site can comprise an active receiver spread measuring 8 km$^2$, with a plurality of receiver points located on a grid every 15–100 m. The seismic receivers are intended to respond to seismic events induced by human-generated explosives or mechanical sources. Accordingly, the receivers are typically configured to record data for time periods of about several seconds. In addition, the use of human-generated explosives limits the geographic distribution of the receivers since explosives often cannot be used within towns or cites, among other examples.

Examples of currently used modes for seismic recording include the following: (1) seismic data from each receiver channel are transmitted to a central collection unit via wires; (2) seismic data from each receiver are transmitted to the central collection unit via radio telemetry; and (3) data from each receiver channel are recorded in flash memory and downloaded later when each unit is connected to and processed by a mass storage device, such as a hard drive. Each of these modes has at least some disadvantages, a common one of which is the need for transmission of specific timing signals to the collection units to synchronize recording with the time of the human-generated seismic-vibration-inducing explosion. For example, while wire telemetry is reliable, quick, and allows examination of the collected data within seconds of recording, it requires the layout and maintenance of wires, which may frequently be disturbed, such as by animals or other sources of disturbance. Radio telemetry removes the need to maintain the wireline correction, but requires maintaining radio contact with all receiver units and the transmission of large amounts of data through shrinking commercial radio bands. Wireless telemetry is also slow and unreliable. The third mode removes some of the wireline connections, but still requires radio transmission of status and specific radio start-time synchronization information.

There is, accordingly, a general need in the art for improved methods and systems of acquiring seismic data.

BRIEF SUMMARY OF THE INVENTION

Embodiments of the invention thus provide methods and systems for acquiring seismic data. In different embodiments, these methods and systems permit continuous monitoring of acoustic information over extended periods of time, and allow for synchronization of acoustic data through use of an ambient signal. These capabilities not only simplify the way in which current seismic testing is performed, but also permit new types of seismic testing to be performed, collecting information from seismic sources whose timing is unknown in advance.

In one set of embodiments, a method is thus provided for acquiring seismic data. Data are collected representing acoustic signals received from the Earth at a plurality of distinct geographic locations. Data representing an ambient signal at the plurality of distinct geographic locations are also collected. For each of the plurality of geographic locations, a known time dependence of the ambient signal is correlated with a time dependence of the collected acoustic-signal data to define time-correlated acoustic signal data. The collected acoustic-signal data for the plurality of distinct geographic locations are synchronized from the time-correlated acoustic-signal data.

In some embodiments, the synchronized acoustic-signal data may be analyzed to identify a subterranean feature. For example, the analysis may comprise generating an acoustic hologram from the synchronized acoustic-signal data. Collection of the data representing acoustic signals may be performed continuously at each of the distinct geographic locations for a period of time that exceeds one minute, one hour, one day, or one week in different embodiments. In one embodiment, the collected data representing the ambient signal are embedded into the collected data representing acoustic signals received from the Earth. The plurality of distinct geographic locations may be at different depths with respect to the surface of the Earth in an embodiment. In one embodiment, the ambient signal comprises an electromagnetic broadcast signal while, in another embodiment, it comprises a time-reference signal.

The methods of the invention may be embodied in a system for acquiring seismic data. A plurality of collectors distributed at the plurality of distinct geographic locations are adapted to collect the data representing acoustic signals received from the Earth and the data representing an ambient signal. A processor coupled with a computer-readable storage medium having a computer-readable program embodied therein is used for correlating time dependences and for synchronizing the collected data by executing instructions in accordance with the embodiments described above.

In some embodiments, the collectors may take the form of seismic sensor data recorders. The seismic sensor data recorder may include a signal preprocessor adapted for receiving a continuous stream of sensor data from a seismic sensor and a radio receiver adapted for receiving a continuous stream of an ambient radio signal. An analog-to-digital converter may be provided in communication with the signal preprocessor and radio receiver, and be adapted to convert the sensor-data to a digital sensor-data stream and to convert the continuous stream of the ambient radio signal to a digital radio-signal stream. A processing unit in communication with the analog-to-digital converter may be adapted to receive and process the digital radio-signal stream and the digital sensor-data stream for storage in a memory.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

FIG. 3 provides a flow diagram illustrating methods for acquiring seismic data in accordance with embodiments of the invention.

DETAILED DESCRIPTION OF THE INVENTION

Figure 1A:
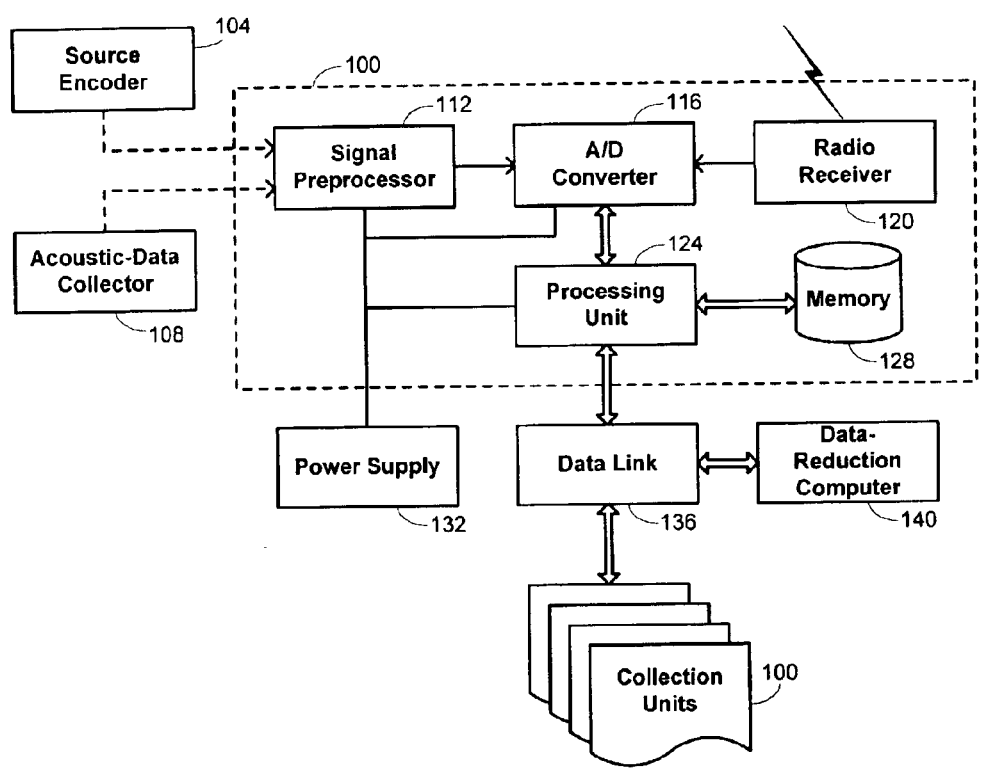
FIG. 1A provides a block-diagram representation of a system for acquiring seismic data in accordance with an embodiment of the invention.

Embodiments of the invention are directed to methods and systems for acquiring seismic data. As used herein, references to "acquiring" seismic data are intended to be construed broadly as referring to various stages in a seismic-data acquisition process, including collection, storage, and processing of seismic data.

Embodiments of the invention make use of a plurality of individual wireless seismic collection units. The individual collection units may function as data sensor recorders and/or as source-event recorders. Each collection unit records an independent stream of seismic data over time, such as in the form of displacement versus time. The collection units do not require radio contact with other collection units, nor do they require direct synchronization with other receiver units or with a source start time. In addition, the collection units do not require that a master unit initiate a recording sequence. In these embodiments, it is possible to eliminate the use of telemetry cables tied to a receiver station. Instead, information distributed to the units may be downloaded using a wireless network protocol, such as a wireless local-area-network protocol, by using a physical connection, or by using an infrared connection.

In some embodiments, each collection unit may comprise a lightweight, battery-powered device that may be attached to the structure of an existing geophone. In addition, any number of units may be used in conjunction with an existing recording system to fill areas of lost coverage. Furthermore, the collection units may be placed in locations difficult for cable-connected geophones to reach or where radio contact is difficult. In certain embodiments, the collection units may be configured for continuous recording over different periods of time, such as periods of time that exceed one minute, periods of time that exceed one hour, and even periods of time that exceed one day. In a particular embodiment, the collection units may record continuously for periods of time that exceed one week. In other embodiments, the collection units may be configured to toggle between on and off positions at predetermined times or in response to seismic vibrations within predetermined amplitude ranges. In either case, data representing the received seismic acoustic signals may be stored on internal memory for later retrieval and processing.

The structure of the collection units permits their random placement within a survey area, permitting a reduction in the spurious phenomenon known as "acquisition footprint" that is present in most three-dimensional seismic data sets. Also, the ability to move a single station collector to random locations permits an increase of receiver-point density and subsurface coverage, commonly referred to as a "fold," in areas of high ambient noise or low source-point density. The actual location of the collection unit after it is placed may be determined with a global-positioning-system ("GPS") unit within the collection unit. Such a feature eliminates the need for a surveyor to measure the location of each individual receiver unit.

The ability of the collection units to record continuously over significant periods of time permits increased flexibility in the data that may be collected and in the types of analyses that may be performed. For example, continuous recording allows stacking many weak source points, such as provided by mini-sosie and elastic-wave generators, thereby increasing the effective depth of reflective signals and reducing unwanted random seismic noise. This ability thus increases the utility of such weaker sources, which otherwise might provide effective data only from near and shallow reflective events. Also, as explained further below, continuous recording permits stacking of passive and/or random sources of noise, which may be used to collect data in urban or suburban environments where the use of explosives is difficult.

Figure 1B:
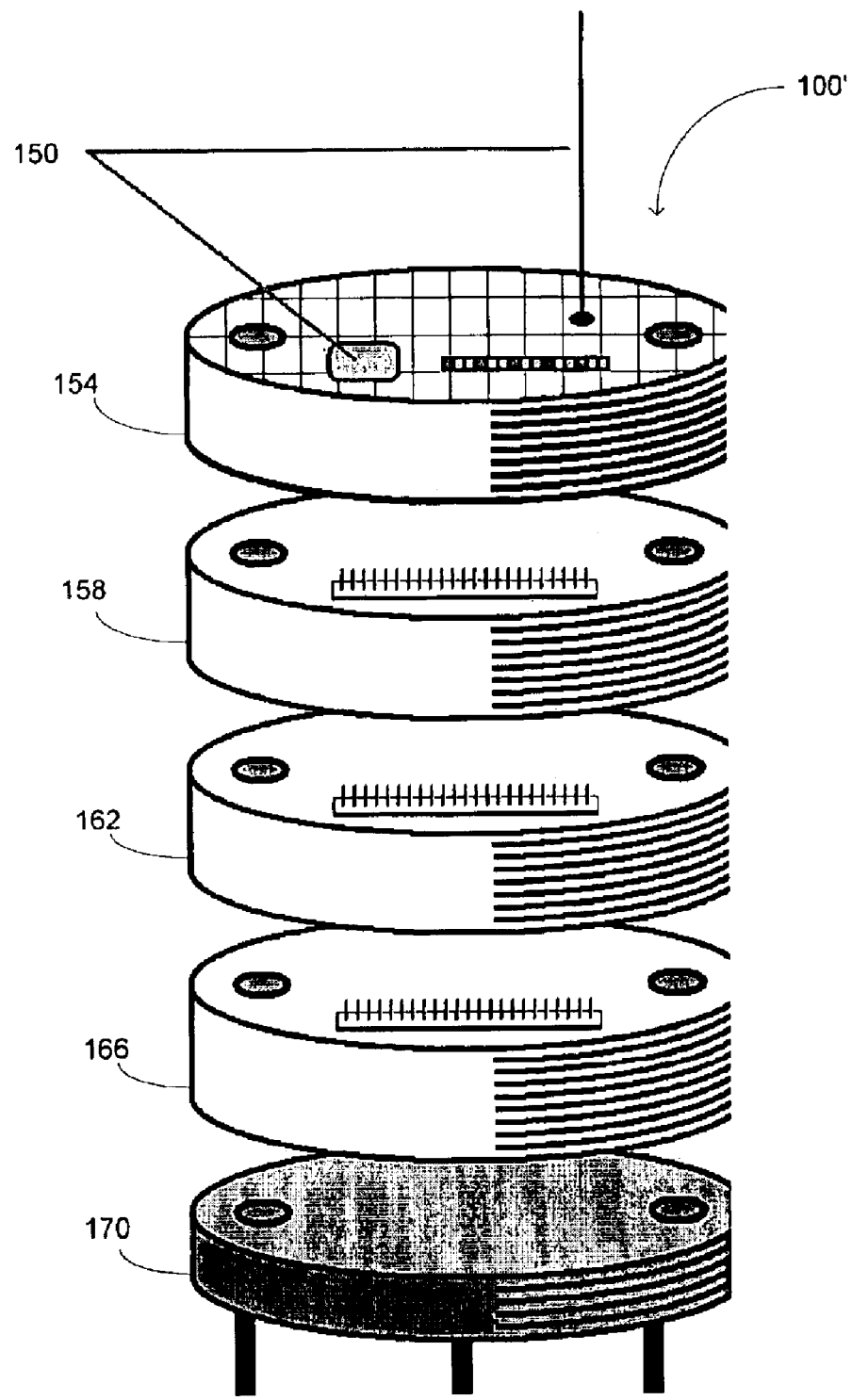
FIG. 1B provides a representation of another arrangement-for a collection unit in an embodiment of the invention.

An example of a collection unit 100 in an embodiment of the invention is shown in FIG. 1A. As shown in FIG. 1A, the collection unit 100 may interface with a source encoder 104, which may be part of vibroseis electronics or of electronics used in conjunction with a dynamite blaster, or an acoustic-data collector 108 such as a geophone, an accelerometer, or the like. There are a variety of different types of geophones that may be used. For example, in one embodiment, P-wave ("primary" or "pressure") collectors are used, which have strings having only vertical elements to detect upward-heading compressional waves; in another embodiment, S-wave ("secondary" or "shear") collectors are used, which have strings having only horizontal elements to detect transverse waves; in a further embodiment, three-component collectors are used, having strings with vertical, in-line, and cross-line sensor elements. Collectors may comprise accelerometers or hydrophones in different embodiments. The source encoder 104 and/or acoustic-data collector 108 may be provided external to the collection unit 100 as shown in FIG. 1A, in which case a housing of the collection unit 100 may comprise external interfacing connections. Alternatively, the source encoder 104 and/or acoustic-data collector 108 may be integrated internally with the collection unit, an example of which is shown in FIG. 1B discussed below. Within the housing are a number of modules, some of which may be included on a printed circuit-board assembly. For example, the printed circuit-board assembly could include a signal preprocessor 112 and an analog-to-digital converter 116 connected with the input sensor for receiving the active seismic data. The signal preprocessor 112 could include amplifiers, filters, and the like to amplify and/or select specific data components of interest from the active seismic data.

In addition, the collection unit 100 may comprise a radio receiver 120 and antenna. The radio receiver 120 may be used as described below to capture an ambient signal for use as an independent synchronization measure. The ambient signal may be an electromagnetic signal that is broadcast for purposes unrelated to seismic investigation. For example, the ambient signal could comprise a radio signal from a nearby AM, FM, short-wave, or other wavelength radio transmission in the form of a local commercial broadcast, GPS timing signal, Universal Synchronized Time broadcast signal, or other ambient signal. Characteristics of the ambient signal may be used to synchronize the collection units 100 by accounting for variations in internal time of the collection units 100. In some instances, the radio receiver 120 is capable only of detecting certain wavelengths so that the collection unit 100 is limited to providing synchronization information with specific types of signals. In other embodiments, the radio receiver 120 is tunable so that it may be configured to identify and collect different types of ambient-signal data in accordance with a defined state of the radio receiver 120. In cases where the radio receiver 120 is configured to receive GPS signals, it may also be configured to function as a GPS unit to derive location information for the collection unit 100.

Thus, when the collection unit 100 is operating and interfaced with an acoustic-data collector 108, the acoustic-data collector 108 provides seismic data such as in the form of collector amplitude versus time on one or more channels. The signal from the collector 108 is passed through the signal preprocessor 112 for amplification and filtering, and then passed to the analog-to-digital converter 116 for digitization. Signals from the radio receiver 120 may also be digitized by the analog-to-digital converter 116 and, in one embodiment, are embedded with the seismic data.

Operation of the signal preprocessor 112, analog-to-digital converter 116, and/or radio receiver 120 may be controlled by a processing unit 124, which may comprise, for example, a commercially available digital signal processor ("DSP"). The digitized seismic data and digitized radio-signal data may be processed by the processing unit 124 and described below, perhaps including embedding them with each other, and stored in a memory device 128, such as flash memory, random-access memory, a hard drive, or the like. In an alternative embodiment, parallel data streams may be used to embed the data representing the ambient signal into the seismic data and to write the ambient-signal data directly to memory. The various components of the collection unit 100 may be powered with a power supply 132, which is shown external to the unit 100 but which may alternatively be integrated internally to the unit 100. The power supply 132 may comprise, for example, a solar cell, a chemical battery, or the like.

FIG. 1B provides an example of one alternative configuration for a collection unit in an embodiment of the invention. In this instance, the collection unit 100' is configured as a layered and integrated acquisition system. The various components are supported by a base plate 170, with the different functionality of the device corresponding to different layers in its structure. For example, the geophone elements 166 may be provided in one layer, the acquisition elements 162 may be provided in another layer, the communications and GPS elements 158 may be provided in a further layer, and the power components 154 are provided in still another layer. In the illustrated embodiment, the power components 154 are provided as a top layer to take advantage of the use of solar cells. It is preferable that the communications and GPS elements 158 be provided in a position where the may communicate easily with antennae 150 that receive the ambient signals. In one embodiment, each collection unit 100' may be provided with at least two antennae receivers 150, one to receive GPS location and system timing signals and the other to conduct inter-unit communications.

Figure 2:
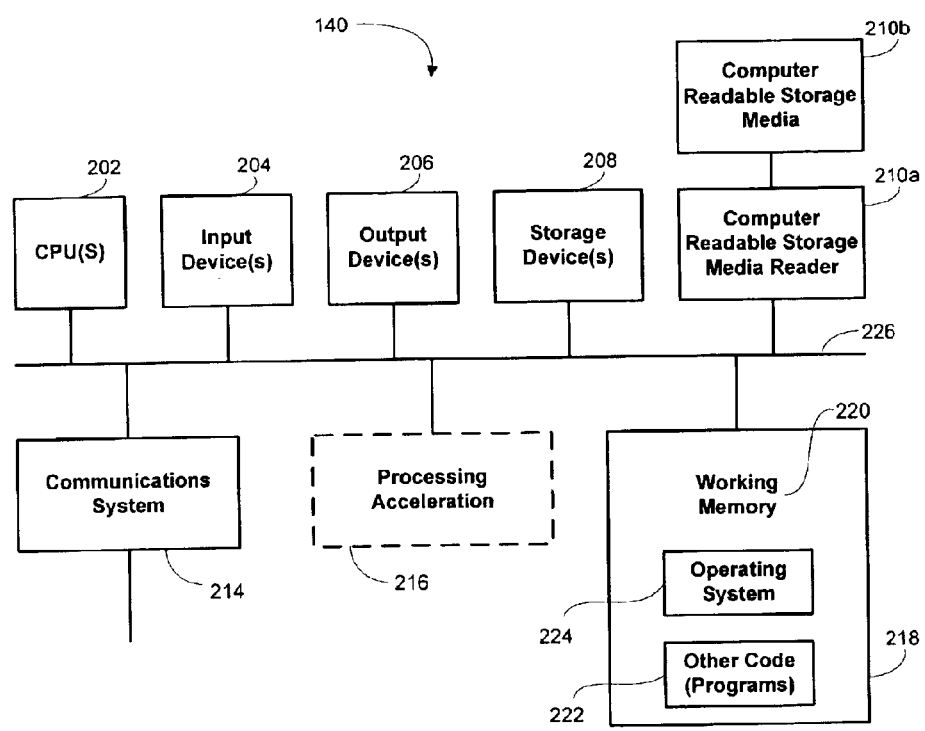
FIG. 2 provides a schematic illustration of a data-reduction computer on which methods of the invention may be embodied.

Referring again to FIG. 1A, a plurality of collection units 100 or 100' used in a seismic analysis may be provided in communication with a data-reduction computer 140 through a data link 136. The data link 136 may comprise, for example, a wireless network, infrared connection, hardware connection, or the like. FIG. 2 provides a schematic illustration of a structure of the data-reduction computer 140 that may be used to implement analysis of data received from the processing units 124 of multiple collection units 100. FIG. 2 broadly illustrates how individual system elements may be implemented in a separated or more integrated manner. The data-reduction computer 140 is shown comprised of hardware elements that are electrically coupled via bus 226, including a processor 202, an input device 204, an output device 206, a storage device 208, a computer-readable storage media reader 210a, a communications system 214, a processing acceleration unit 216 such as a DSP or special-purpose processor, and a memory 218. The computer-readable storage media reader 210a is further connected to a computer-readable storage medium 210b, the combination comprehensively representing remote, local, fixed, and/or removable storage devices plus storage media for temporarily and/or more permanently containing computer-readable information. The communications system 214 may comprise a wired, wireless, modem, and/or other type of interfacing connection and permits data to be exchanged with the data link 136 for collection of data to be processed from multiple collection units 100.

The data-reduction computer 140 also comprises software elements, shown as being currently located within working memory 220, including an operating system 224 and other code 222, such as a program designed to implement methods of the invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

Methods using the system to acquire seismic data in embodiments of the invention are summarized with the flow diagram of FIG. 3. The order of the blocks shown in FIG. 3 is exemplary and is not intended to be construed as an order in which functions need be performed; in alternative embodiments, the functions indicated in FIG. 3 may be performed in a different order. At block 302, start-time data are collected, and may be used later in the method to establish which collected data are useful. At block 304, acoustic data are collected with the collection units 100. If the units 100 are not already distributed within a survey area, such collection may begin with distribution of the units 100 over the survey area by one or more installers. Typically, the installer will record a serial number identifying each of the units 100 distributed and the location where it is distributed. Such installation may be facilitated with a handheld computational device having a communications port for communicating with the collection unit 100, such as a personal-digital assistant ("PDA"). When the collection unit 100 is positioned, the installer may enter instructions on the handheld computational device to instruct the collection unit 100 as to mode of operation, i.e. whether it is to operate continuously, respond to signals of predetermined vibrations, to transmit data or store data locally as they are collected, the type of ambient signals to detect and record, and the like. In some instances, the installer may record additional information about each collection unit 100 such as a status of the unit 100 when it is positioned.

With the collection units 100 distributed over the survey area, they each collect acoustic data and ambient-signal data in accordance with their instructions at blocks 304 and 308. If the state of the collection unit 100 indicates that the ambient-signal data are to be embedded with the acoustic seismic data, such embedding is performed at block 312, usually in accordance with programming instructions of the processing unit 124. In one embodiment, the embedded data corresponds to a superposition of the ambient-signal data with the acoustic seismic data in a fashion that preserves their time dependence. In this way, to the extent that features from the ambient signal remain identifiable, they may be directly synchronized with the acoustic seismic data in which they are embedded. Furthermore, when such features remain identifiable in the data collected by a plurality of the collection units 100, they allow synchronization among the separate sets of data. In other embodiments, the collected ambient signal might be retained separately from acoustic seismic data signals; such separately retained signals may still be used for synchronization if their relative time dependencies are maintained for each of the collection units 100. Embedding the signals, however, has the advantage of ensuring ab initio that information defining such relative time dependencies is preserved.

Irrespective of whether the data signals are embedded with each other, the data may be written to a storage device at block 316. In one embodiment, the data are written to the memory 128 comprised by a respective one of the collection units 100. Such embodiments are especially convenient when surveying remote areas over relatively long periods of time, but may be used in any embodiments where seismic data are collected. In alternative embodiments, the data may be downloaded temporarily into an external data-storage device, such as in a portable laptop or handheld computer, or may even be transmitted directly through the data link 136 to the data-reduction computer 140 when possible. If the data are stored locally to the collection units 100, the data may be recovered at a later point in time and transmitted to the data-reduction computer 140 by any suitable means so that analysis of the group of data sets may begin at block 320.

For each data set, the analysis begins by correlating the time dependence of the ambient signals to the collected acoustic seismic data at block 320 and then synchronizing the multiple data sets at block 324. The correlation and synchronization functions at this stage are greatly simplified in embodiments where the ambient and seismic signals have been embedded with each other since such embedding preserves the time correlations between them. Preservation of such time correlations permits synchronization to proceed at block 324 by identifying unique features from the ambient signal in each of the combined seismic/ambient signals. In some instances, one unique feature may be sufficient to perform the identification, but it may be desirable to use multiple features for synchronization where the signal variation is complex or to increase confidence levels in the synchronization. One of the combined signals may be selected as a baseline signal defining a canonical time sequence. Each of other combined signals may then be shifted in time so that the selected identification feature(s) match their occurrence in the canonical time sequence. In some embodiments, the determination of time shifts is facilitated by calculating cross-correlation functions to identify times of maximal correlation. Such time shifts may occur in either the positive or negative direction depending on the specific signal chosen to define the canonical time sequence and depending on the specific variations of the other signals.

In some instances, synchronization may also include application of a compression or expansion factor to the time sequence of given signals. It is generally expected that the need for compression or expansion of a time sequence will be rare, but it may be appropriate if circumstances have caused the rate of recordation of some signals to differ from the rate of other signals. In such instances, simple linear time translation of the signals may be insufficient to match multiple identification features from the ambient signal to the canonical time sequence. Application of a compression or expansion factor may be viewed as a mapping $f(t) \rightarrow f(\alpha t)$, where $\alpha > 1$ corresponds to a compression and $\alpha < 1$ corresponds to an expansion for embedded ambient/seismic signal $f(t)$.

For example, suppose that the set of embedded signals received by the data-reduction computer 140 is denoted $f_i(t)$. The canonical time sequence may be defined by a particular one of these signals, say $f_0(t)$. Supposing that identification features may be identified at a set of time intervals $\{\Delta t_j\}$, synchronization may proceed by finding $\alpha_i$ and $\delta_i$ so that these features are reproduced at these same time intervals $\{\Delta t_j\}$ in each of $f_i(\alpha_i t - \delta_i)$.

Essentially the same techniques may be used when the ambient-signal data have not been embedded with the acoustic seismic data. Since both data sets for a given collection unit 100 were collected substantially simultaneously and with a single collection unit 100, however, the time correlation between the two is not expected to involve compression or expansion of the time dependence. Instead, a particular time value is assigned as a common time origin for both the seismic data and for the ambient data for each respective collection unit 100. Calculations to effect the synchronization may then initially be performed solely on the ambient-signal data, with time shifts and compression/expansion factors being determined for data from each collection unit 100 to time-align identification features of the ambient-signal data. These respective shifts and compression/expansion factors may then be applied to the corresponding seismic data to complete the synchronization.

For example, suppose the set of seismic data is defined by $S_i(t)$ and the set of ambient data is defined is defined by $A_i(t)$ according to respective time origins. Synchronization may then be performed on the set of $A_i(t)$ in a fashion similar to that for $f_i(t)$ described above, with a canonical ambient signal $A_0(t)$ being chosen and factors $\alpha_i$ and $\delta_i$ being determined to match a set of identification features over the set of time intervals $\{\Delta t_j\}$. These determined factors may then be applied to the seismic data to produce a set of pure synchronized seismic signals $S_i(\alpha_i t - \delta_i)$ for use in subsequent analysis.

In some instances, the subsequent analysis may make use of only selected portions of the synchronized data, such as portions of the data within certain time intervals surrounding known source events. Accordingly, at block 326, a quality-control procedure may be used to ensure that data used in the analysis meet predetermined quality levels and are unlikely to represent spurious results. At block 328, the useable time windows are extracted from the synchronized data sets. Identification of the useable time windows may be performed by software in the data-reduction computer 140 to note source event times, such as collected at block 302, and to select regions having specific time intervals about synchronized correspondences to such source event times. The unwanted data may then be deleted at block 332. Deletion of such data may be appropriate where the data are to be used only for analysis to identify subterranean features. In other instances, the data may be used for other purposes that may make it desirable for the full data set to be retained. Some examples of such applications are discussed below. In some embodiments After processing, the data may be stored on a mass storage device as indicated at block 336. In addition, it may be delivered to a client who has paid for collection and preparation of the data at block 340, or may be subjected to further analysis as indicated at block 344 to identify subterranean features. Techniques for such analysis using synchronized data are known to those of skill in the art and may include a variety of processing and acoustic reconstruction techniques. In one embodiment, the analysis makes use of an acoustic holographic technique. An early example of a description of acoustic holography is provided generally in U.S. Pat. No. 4,070,643, entitled "ACOUSTIC HOLOGRAPHY APPARATUS," the entire disclosure of which is incorporated herein by reference for all purposes, although other acoustic-holographic techniques that may be applied to the synchronized seismic data will also be known to those of skill in the art.

FIGS. 4A–4E provide examples of acoustic-data traces to illustrate effecting synchronization with the ambient-signal information. In embodiments where the ambient signal corresponds to a commercial broadcast signal, such as a radio-program or television-program signal, there may be characteristics in voice patterns or other variations over certain time intervals $\{\Delta t_j\}$ that may be used as the identification features. The inventors have found, for example, that the voices of certain speakers have frequency characteristics that make them especially suitable for providing identification features against seismic acoustic data, particularly among speakers with voices in the low end of the normal human frequency range.

Figure 4A:
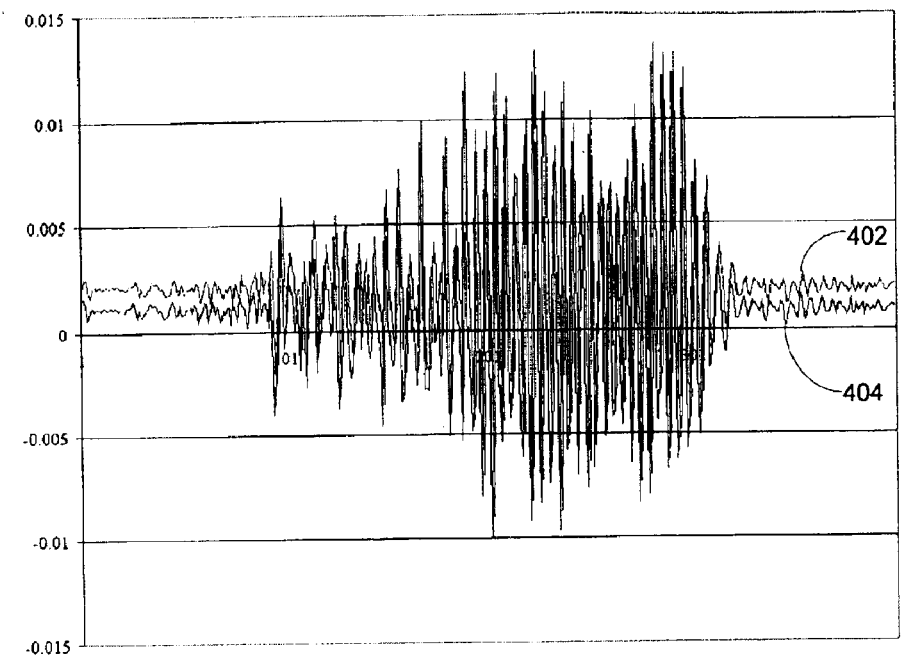
FIGS. 4A–4E provide exemplary acoustic traces illustrating aspects of synchronization techniques used in embodiments of the invention.
Figure 4B:
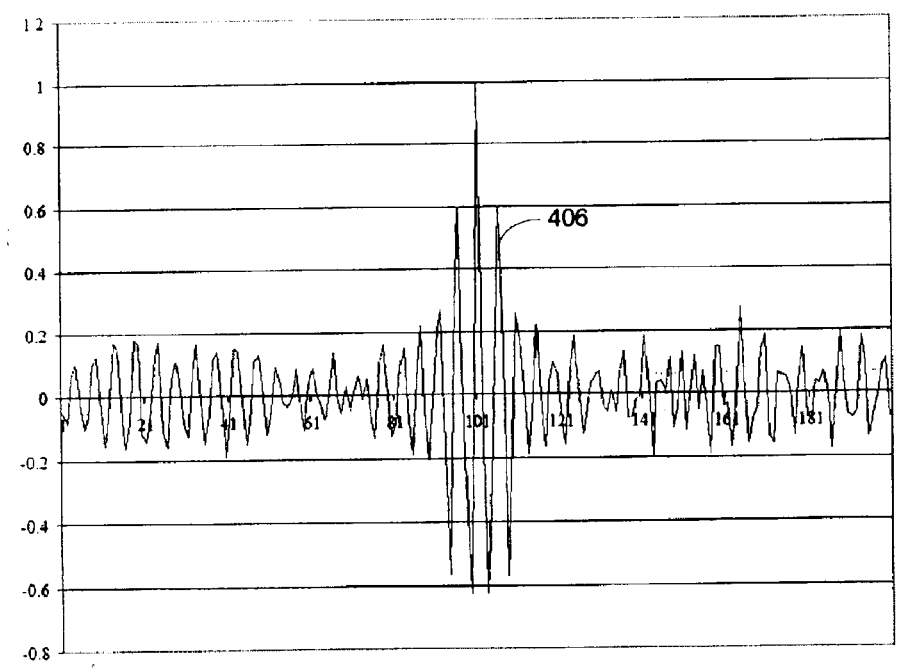

To illustrate the ability to use voice patterns as identification features, FIG. 4A provides an example of a human-voice signal recorded with two different collection units 100, respectively designated 402 and 404. The signal is from a popular motivational speaker often heard on television and radio who has a low-frequency voice of the type that the inventors have identified as particularly suitable for use in synchronization according to embodiments of the invention. While the general behavior of the voice signals is clearly seen to be similar from FIG. 4A, actual matching of the time sequences for them may be facilitated through known correlation-evaluation techniques, such as through calculation of a cross-correlation function. For two functions $V^{(1)}(t)$ and $V^{(2)}(t)$, such as the voice functions shown in FIG. 4A but generally applicable to any of the ambient-signal data or combined ambient/seismic-signal data discussed above, the cross-correlation C at delay δ is $$C(\delta) = \frac{\int dt (V^{(1)}(t) - \langle V^{(1)} \rangle)(V^{(2)}(t-\delta) - \langle V^{(2)} \rangle)}{\sqrt{\int dt (V^{(1)}(t) - \langle V^{(1)} \rangle)^2} \sqrt{\int dt (V^{(2)}(t-\delta) - \langle V^{(2)} \rangle)^2}},$$

where $\langle <V^{(1)} \rangle$ and $\langle <V^{(2)} \rangle$ are respectively the mean of $V^{(1)}(t)$ and $V^{(2)}(t)$. T which the cross-correlation C is maximized corresponds to the time shift to be introduced in synchronizing $V^{(1)}(t)$ and $V^{(2)}(t)$. The value of δ at FIG. 4B provides the cross-correlation function 406 resulting from a calculation using the signals shown in FIG. 4A. Since the signals 402 and 404 in FIG. 4A are substantially properly aligned, the maximal correlation value falls approximately in the center of the window. If the signals did not match and required a time shift for synchronization, the maximal correlation value would be offset by an amount δ, which would then be used as described above in providing the synchronized signals.

Figure 4C:
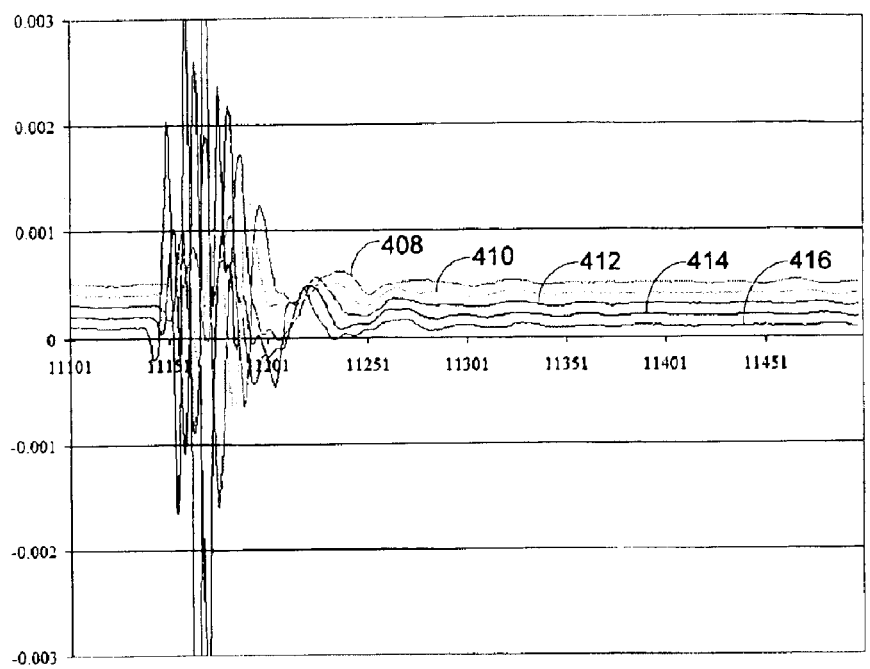
Figure 4D:
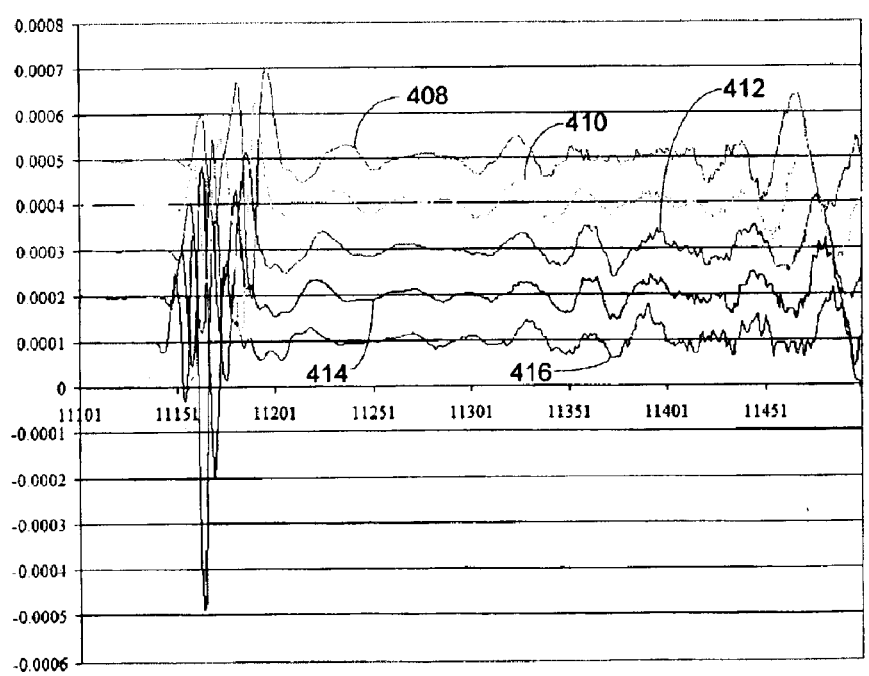

The inventors have tested application of this technique with actual seismic data, with results shown in FIGS. 4C and 4D. The traces in FIG. 4C are displayed in true amplitude and the traces in FIG. 4D reflect the application of an automatic gain control. The traces are offset by amounts from the surveyed ground locations, with trace 408 being offset by 25 feet, trace 410 being offset by 20 feet, trace 412 being offset by 15 feet, trace 414 being offset by 10 feet, and trace 416 being offset by 5 feet. The traces have been synchronized using the techniques described above. The apparent offset, from bottom-to-top and from left-to-right, thus reflects a real physical change that provides information about the area being surveyed. In this instance, this physical change corresponds to differences in travel times resulting from the increase in offsets between the source and collection units 100. A velocity derived from differences in the trace offset divided by differences in arrival time is very close to the speed of sound in air, about 1100 ft/s. In cases where the acoustic signals are received from the Earth, the differences in the synchronized curves provide structural information about subterranean objects, such as hydrocarbon-gas or oil deposits. In one set of embodiments, such information is derived from acoustic signals received from inside the Earth.

Figure 4E:
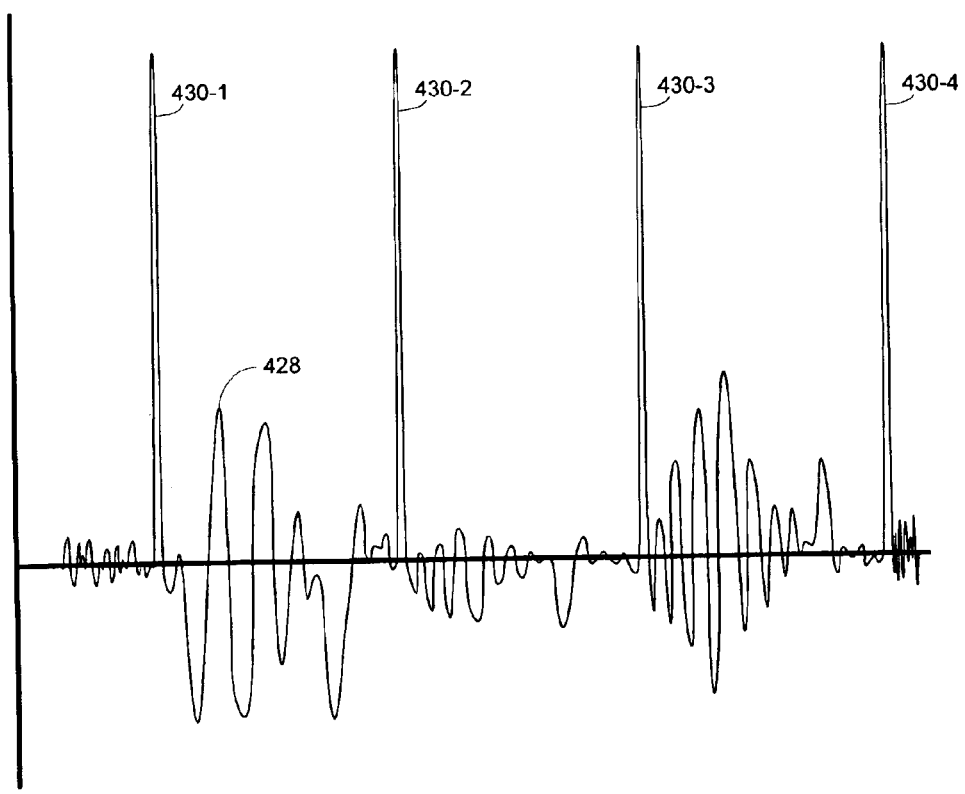

The voice signals of FIG. 4A are examples of irregular signals that may be used in synchronization. FIG. 4E provides an example of regular signals 430 derived from an ambient signal, with those signals embedded in seismic acoustic data 428 measured by one of the collection units 100. Such regular signals may result from ambient signals that correspond, for example, to GPS time signals, Universal Synchronized Time broadcast signal, and the like. The regularity of such ambient signals 430, particularly when their amplitude is sufficient to swamp the seismic acoustic signals 428, permits them to be used in synchronization without the use of cross-correlation calculations. In particular, the well-defined nature of such signals permits the time intervals $\{\Delta t_j\}$ to be very narrow, with precise central time values. Accordingly, in some embodiments, synchronization is performed with regular ambient signals directly, while in other embodiments synchronization, even with regular ambient signals, may still be performed with a cross-correlation technique.

Exemplary Applications

There are a number of applications using the methods and systems of the invention that illustrate advantages in some embodiments. In some embodiments, for example, the collection units may be used with human-initiated events. Some such human-initiated events may be intended specifically to provide acoustic sources for use in seismic investigation while others may provide seismic information only passively or incidentally. For example, in some embodiments, the collection units may be distributed over a survey area where explosions may be initiated with dynamite, but which has poor radio contact. In such instances, the convenience of the units' ability to collect data continuously, without the need for radio contact, may be exploited in combination with the ease of synchronization despite the poor radio contact of the survey area. Also, in some instances, the geographical distribution of the collection units may vary in depth with respect to the surface of the Earth, rather than solely on or above its surface. For example, some of the units could be positioned within vertical mines or other shafts, enabling information resulting from different collector-unit distributions to be obtained. Analysis using data from such a vertical distribution of collector units is sometimes referred to as "tomographic analysis."

In other embodiments, seismic data may be collected passively from an urban or suburban area, or from any other area where active data acquisition is difficult. Passive source events may be produced, for example, by placing obstructions laterally across road surfaces so that acoustic events are initiated when vehicles drive over them. Other mechanisms for passive generation of acoustic events will be apparent to those of skill in the art. The collection units may then be placed near in the urban or suburban regions to detect acoustic responses to these sources from the Earth. The ability of the collection units to record continuously over long periods of time without specific knowledge of the timing of acoustic events permits them to collect information that may then be used as described herein to identify subterranean properties in the urban, suburban, or other survey area. It is generally expected that the magnitude of such passive acoustic sources will be most suitable for mapping shallow events, but in some instances mapping of deeper events may also be performed in this manner.

The use of long-time continuous recording without specific knowledge of acoustic-event timing may be exploited in peripheral applications. For example, seismic testers are frequently subject to complaints from homeowners and others that explosions used to generate acoustic sources have resulted in damage to structures. The cost to defend such allegations by seismic testers is significant. Very often, the strength of acoustic impulses at the locations where structures have been damaged is insufficient to cause the damage reported, but there is frequently insufficient information to point to an alternative source for the damage. The use of some of the collection units during a seismic test period at various locations may produce more specific evidence that may be used in the defense of such allegations, specifically by providing a real-time record of peak particle velocity ("PPV") in defined locations. In particular, the collection units may indicate not only the local strength of the explosion alleged to have caused the damage at those defined locations, but also the local strength of other acoustic sources, such as may be provided by aircraft, trains, weather patterns, and the like. In instances where the PPV at a particular time and location is clearly linked with a different acoustic event, the likelihood that damage was caused by the seismic testing is at best minimal. This ability to provide comparative evidence, correlated with the time other sources produced acoustic disturbances, may allow unwarranted allegations to be disposed of more quickly.

Having described several such embodiments, it will be recognized by those of skill in the art that various other modifications, alternative constructions, and equivalents may be used without departing from the spirit of the invention. Accordingly, the above description should not be taken as limiting the scope of the invention, which is defined in the following claims.

What is claimed is:

1. A method for acquiring seismic data, the method comprising:
    collecting data representing acoustic signals received from the Earth at a plurality of distinct geographic locations;
    collecting data representing an ambient signal at the plurality of distinct geographic locations;
    for each of the plurality of geographic locations, correlating a known time dependence of the ambient signal with a time dependence of the collected acoustic-signal data to define time-correlated acoustic signal data; and
    synchronizing the collected acoustic-signal data for the plurality of distinct geographic locations from the time-correlated acoustic-signal data.

2. The method recited in claim 1 further comprising analyzing the synchronized acoustic-signal data to identify a subterranean feature.

3. The method recited in claim 2 wherein analyzing the synchronized acoustic-signal data comprises generating an acoustic hologram from the synchronized acoustic-signal data.

4. The method recited in claim 1 wherein collecting data representing acoustic signals is performed continuously at each of the distinct geographic locations for a period of time that exceeds one minute.

5. The method recited in claim 1 wherein collecting data representing acoustic signals is performed continuously at each of the distinct geographic locations for a period of time that exceeds one hour.

6. The method recited in claim 1 wherein collecting data representing acoustic signals is performed continuously at each of the distinct geographic locations for a period of time that exceeds one day.

7. The method recited in claim 1 wherein collecting data representing acoustic signals is performed continuously at each of the distinct geographic locations for a period of time that exceeds one week.

8. The method recited in claim 1 further comprising embedding the collected data representing the ambient signal into the collected data representing acoustic signals received from the Earth.

9. The method recited in claim 1 wherein collecting data representing acoustic signals received from the Earth comprises receiving acoustic data generated in response to a human-initiated event.

10. The method recited in claim 1 wherein the plurality of distinct geographic locations are at different depths with respect to the surface of the Earth.

11. The method recited in claim 1 wherein the ambient signal comprises an electromagnetic broadcast signal.

12. The method recited in claim 1 wherein the ambient signal comprises a time-reference signal.

13. A system for acquiring seismic data, the system comprising:
    a plurality of collectors distributed at a plurality of distinct geographic locations, wherein each such collector is adapted to:
        collect data representing acoustic signals received from the Earth; and
        collect data representing an ambient signal; and
    a processor coupled with a computer-readable storage medium having a computer-readable program embodied therein for directing operation of the processor, the computer-readable program including:
        instructions for correlating a known time dependence of the ambient signal with a time dependence of the collected acoustic-signal data to define time-correlated acoustic-signal data; and
        instructions for synchronizing the collected acoustic-signal data for the plurality of geographic locations from the time-correlated acoustic-signal data.

14. The system recited in claim 13 wherein the computer-readable program further includes instructions for analyzing the synchronized acoustic-signal data to identify a subterranean feature.

15. The system recited in claim 13 wherein each such collector includes a data store capable of storing data collected continuously over a period of time that exceeds one week.

16. The system recited in claim 13 wherein each such collector is further adapted to embed the collected data representing the ambient signal into the collected data representing acoustic signals received from the Earth.

17. The system recited in claim 13 wherein the ambient signal comprises an electromagnetic broadcast signal.

18. The system recited in claim 13 wherein the ambient signal comprises a time-reference signal.

* * * * *

US006934219C1

(12) INTER PARTES REEXAMINATION CERTIFICATE (0254th)

United States Patent
Burkholder et al.

(10) Number: US 6,934,219 C1
(45) Certificate Issued: Apr. 5, 2011

(54) METHODS AND SYSTEMS FOR ACQUIRING SEISMIC DATA

(75) Inventors: Scott K. Burkholder, Littleton, CO (US); Paul D. Favret, Littleton, CO (US); Todd J. Fockler, Golden, CO (US); Robert Stewart, Boulder, CO (US)

(73) Assignee: Ascend Geo, LLC, Denver, CO (US)

Reexamination Request:
No. 95/000,498, Sep. 23, 2009

Reexamination Certificate for:
Patent No.: 6,934,219
Issued: Aug. 13, 2005
Appl. No.: 10/418,940
Filed: Apr. 18, 2003

Related U.S. Application Data

(60) Provisional application No. 60/375,545, filed on Apr. 24, 2002.

(51) Int. Cl.
*G01V 1/24* (2006.01)
*G01V 1/28* (2006.01)

(52) U.S. Cl. .................... 367/55; 367/39; 367/42
(58) Field of Classification Search .................. None
See application file for complete search history.

(56) References Cited

U.S. PATENT DOCUMENTS

| | | |
|---|---|---|
| 4,070,643 A | 1/1978 | Green |
| 4,281,403 A | 7/1981 | Siems et al. |
| 5,600,318 A | 2/1997 | Li |
| 5,724,241 A | 3/1998 | Wood et al. |
| 5,978,313 A | 11/1999 | Longaker |
| 6,002,640 A | 12/1999 | Harmon |
| 6,188,962 B1 | 2/2001 | Morgan et al. |
| 2004/0252585 A1 | 12/2004 | Smith et al. |

OTHER PUBLICATIONS

Asch, Gunter. "6 Seismic Recording Systems." Manual of Seismological Observatory Practice. (Sep. 13, 2000) Accessed Web, Jul. 15, 2009. <http://seismo.um.ac.ir/education/Seismic%20Recorders.htm>.

Borcherdt, R.D., J.B. Fletcher, E.G. Jensen, G.L. Maxwell, J.R. Van Schaack, R.E. Warrick, E. Cranswick, M.J.S. Johnston, and R. McClearn. "A General Earthquake–Observation System (GEOS)," Bulletin of the Seismological Society of America, vol. 75, No. 6 (Dec. 1985): 1785–1825.

Elson, Jeremy, and Deborah Estrin, "Time Synchronization for Wireless Sensor Networks," Proceedings of the 2001 International Parallel and Distributed Processing Symposium, Workshop on Parallel and Distributed Computing Issues in Wireless Networks and Mobile Computing. San Francisco, California: Los Angeles, Apr. 2001. UCLA CS Technical Report 200028.

Havskov, J., L. B. Kvamme, R. A. Hansen, H. Bungum, and C.D. Lindholm, "The Northern Norway Seismic Network: Design, Operation, and Results," Bulletin of the Seismological Society of America, vol. 82, No. 1 (Feb. 1992): 481–496.

Husen, Stephan. "Local Earthquake Tomography of a Convergent Margin, North Chile: A Combined On–and Offshore Study," (Doctoral dissertation, Christian–Albrechts–Universität zu Kiel, Kiel, Germany, 1999).

(Continued)

*Primary Examiner*—Jeanne M Clark

(57) ABSTRACT

Methods and systems are provided for acquiring seismic data. Data are collected representing acoustic signals received from the Earth at distinct geographic locations. Data representing an ambient signal at the distinct geographic locations are also collected. For each of the geographic locations, a known time dependence of the ambient signal is correlated with a time dependence of the collected acoustic-signal data to define time-correlated acoustic signal data. The collected acoustic-signal data for the distinct geographic locations are synchronized from the time-correlated acoustic-signal data.

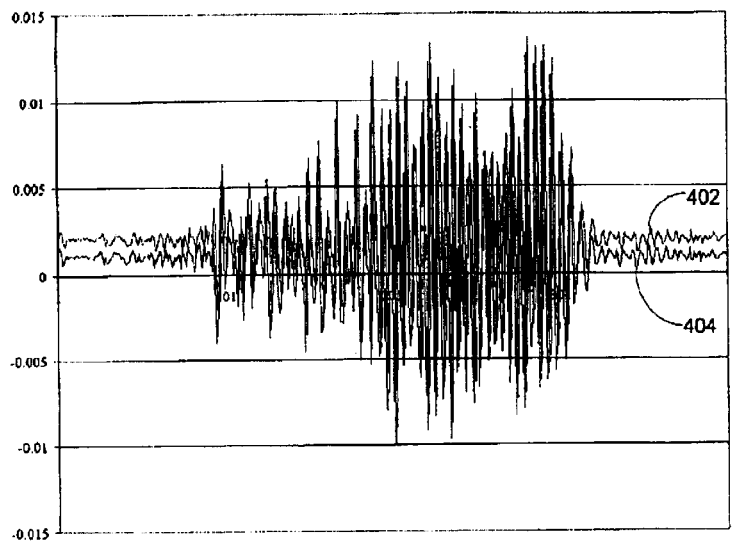

OTHER PUBLICATIONS

Ichinose, Gene A., Kenneth D. Smith, and John G. Anderson. "Seismic Analysis of the Jan. 7, 1998 Chemical Plant Explosion at Kean Canyon, Nevada," Bulletin of the Seismological Society of America, vol. 89, No. 4 (Aug. 1999): 938–945.

La Rocca, M., E. Del Pezzo, M. Simini, R. Scarps, and G. De Luca. "Array Analysis of Seismograms from Explosive Sources: Evidence for Surface Waves Scattered at the Main Topographical Features," Bulletin of the Seismological Society of America, vol. 91, No. 2 (Apr. 2001): 219–231.

Lee, W. H. K., T.C. Shin, K.W. Kuo, K.C. Chen and C.F. Wu. "CWB Free–Field Strong–Motion Data from the Sep. 21, Chi–Chi, Taiwan, Earthquake," Bulletin of the Seismological Society of America, vol. 91, No. 5 (Oct. 2001): 1370–1376.

Lehner, Francis E., and Frank Press. "A Mobile Seismograph Array," Bulletin of the Seismological Society of America, vol. 56, No. 4 (Aug. 1966): 889–897.

Ohmberger, Matthias. (2001). "Continuous Automatic Classification of Seismic Signals of Volcanic Orgin at Mt. Merapi, Java, Indonesia," (Doctoral dissertation, Universitat Potsdam, Potsdam, Germany, Apr. 2001).

Refraction Technology, Inc.'s Manual: "REFTEK(tm) Recording Formal Specifications of REFTEK Data Recording Systems: Vers. 2.93 DAS CPU Firmware (Passcal Compliant), " Sep. 1988. Document No. 72A–S–002.00.1.

Schneider, John F., Richard C. Aster, Lee A. Powell, and Robert P. Meyer. "Timing of Portable Seismographs from Omega Navigation Signals," Bulletin of the Seismological Society of America, vol. 77, No. 4 (Aug. 1987): 1457–1478.

Stuart, G.W., D. Francis, D. Gubbins, and G. Smith, "Tararua Broadband Array, North Island, New Zealand," Bulletin of the Seismological Society of America, vol. 85, No. 1 (Feb. 1995): 325–333.

Smith, Steven W. The Scientist and Engineer's Guide to Digital Processing. Chapter 7: Properties of Convolution (1997).

U.S. Department of Commerce, National Bureau of Standards Boulder Laboratories, Boulder, Colorado: Standard Frequencies and Time Signals WWV and WWVH, Letter Circular LC1023, Jun. 1956.

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-18 are cancelled.

* * * * *